(12) United States Patent
Tanabata et al.

(10) Patent No.: US 6,738,131 B2
(45) Date of Patent: May 18, 2004

(54) DISTANCE MEASURING METHOD AND IMAGE INPUT DEVICE WITH DISTANCE MEASURING FUNCTION

(75) Inventors: Takanari Tanabata, Ishioka (JP); Keisuke Nakashima, Hitachi (JP); Yoshiharu Konishi, Owariasahi (JP); Takashi Matsuyama, Kyoto (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/163,572

(22) Filed: Jun. 7, 2002

(65) Prior Publication Data

US 2002/0196422 A1 Dec. 26, 2002

(30) Foreign Application Priority Data

Jun. 18, 2001 (JP) ........................................ 2001-183659

(51) Int. Cl.[7] ................................................. G01C 3/08
(52) U.S. Cl. ..................................... 356/4.04; 356/4.01
(58) Field of Search ...................... 356/4.01, 3.14–3.16, 356/4.04

(56) References Cited

U.S. PATENT DOCUMENTS 3,617,128 A * 11/1971 Harvey
4,391,513 A * 7/1983 Fujiki
4,441,810 A * 4/1984 Momose et al.
4,698,493 A * 10/1987 Fried
5,488,471 A * 1/1996 McClenahan et al.

FOREIGN PATENT DOCUMENTS

JP 2963990 * 8/1999

OTHER PUBLICATIONS

IEEE Computer Society Conference on Computer Vision and Pattern Recognition; Jun. 23–25, 1998, Santa Barbara, CA; Hiura et al, p.953–959.*

* cited by examiner

*Primary Examiner*—Stephen C. Buczinski
(74) *Attorney, Agent, or Firm*—Antonelli, Terry, Stout & Kraus, LLP

(57) ABSTRACT

A distance measuring technology is capable of stably and accurately performing measurement of the distance to the distance to an object without use of a highly accurate focus control mechanism. The distance measurement is performed by an apparatus having a mask for restricting light so as to pass light through two or more different light passing positions; a lens system for focusing the light that has passed through the mask; an image taking-in means for taking in images from the light focused by the lens system; and a distance calculating unit for calculating a distance from an imaging element to an object using the taken-in images. The mask restricts the light so that the light is able to pass through only specified positions.

16 Claims, 12 Drawing Sheets

131L — STATUS OF ALLOWING LIGHT TO PASS THROUGH

131D — STATUS OF INHIBITING LIGHT FROM PASSING THROUGH

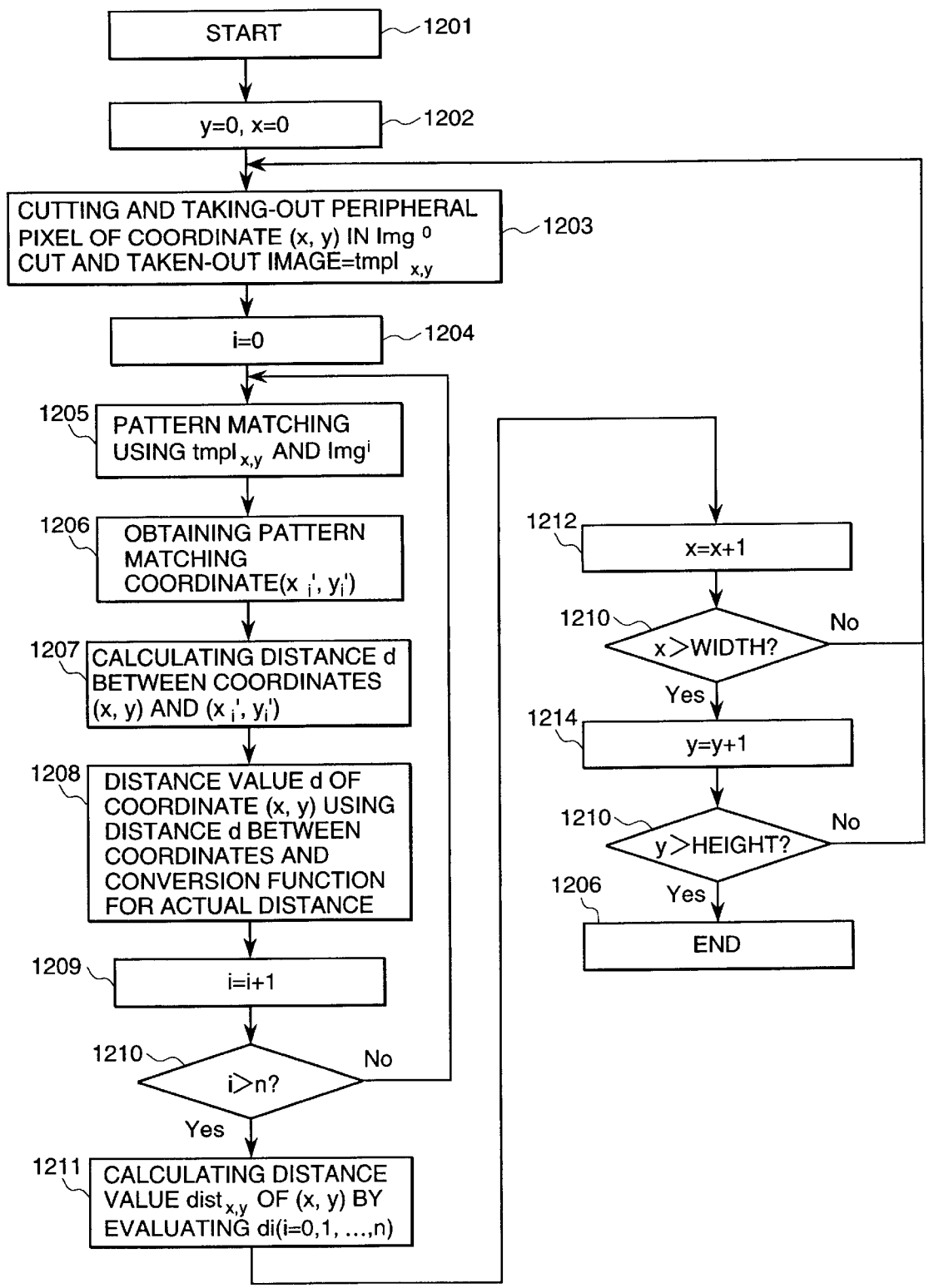

MEASURED RESULT OF DISPLACEMENT OF IMAGE AND DISTANCE VALUE

E: y=3.3876x-2.9625

DISTANCE MEASURING METHOD AND IMAGE INPUT DEVICE WITH DISTANCE MEASURING FUNCTION

BACKGROUND OF THE INVENTION

The present invention relates to a technology used at optically measuring a distance, and particularly to a distance measuring apparatus and an image input apparatus.

In order to obtain information on a three-dimensional shape and a position of an object in an image from the image taken by a camera, apparatuses for measuring a distance from the camera to each point in the image have been proposed and commercially available.

As one of the methods of obtaining a distance using an image, there are proposed various kinds of methods of measuring a distance using a relation between blur caused by a positional relation between a lens and an imaging plane and the distance to a camera target.

Among the above methods, there are proposed some methods which use a relation between magnitudes of blur and distance instead of directly obtaining an in-focus position of the lens. Among these methods, a method proposed by Professor Nayar of Columbia University uses a telecentric optical system and a double focus camera. Further, in a technology disclosed in Japanese Patent No.2963990, there is proposed a method using a structured coded opening (pupil) in order to make analysis of the blur easy.

As pointed out in Japanese Patent No.2963990, the method proposed by Nayar requires modeling of the lens aberration, precise positioning of the CCD (charge-coupled device) and removing of noise from an obtained image because the method uses a simple circular opening lens. Further, it is difficult to measure an object at a long distant position and to secure depth accuracy because the magnitude of blur is limited to a comparatively small value.

On the other hand, in the method proposed by Japanese Patent No.2963990, a pupil-shaped light passing means for transmitting light is used so as to make the analysis of magnitude of blur easy. Thereby, it is possible to perform distance measurement without occurrence of any problems in the above-mentioned method of Nayar.

In each of the above-mentioned methods, the distance measurement is performed by analyzing blurs in images taken at different focuses. As the means for taking the images at the different focuses, there are proposed a method in which the plurality of different focused images are taken several times by sequentially moving the lens to change the focus and a method in which the plurality of different focused images are taken at a time by dispersing the incident light to n directions using prisms.

In the method by sequentially moving the lens, it is necessary to perform the focus control with high accuracy. On the other hand, in the method by using the prisms, the amount of light in the observed image at each focus becomes 1/n because the incident light is divided into n parts. Accordingly, the amount of charge obtained by the CCD is reduced. Therefore, this method is weak against electron noise, and is difficult to improve the measuring accuracy.

As having been described above, in each of the conventional methods, the requirement to the operating accuracy of the focus control mechanism in the measurement apparatus becomes extremely high. As the result, the satisfaction of the above requirement becomes an important problem for commercially using the measurement apparatus.

SUMMARY OF THE INVENTION

An object of the present invention is to provide a distance measuring technology capable of stably and accurately performing distance measurement of an object without any highly accurate focus control mechanism.

In order to solve the above-mentioned problem, a distance measuring apparatus and an image input apparatus using a single-focus camera without any focus control mechanism are proposed.

The apparatus comprises a light passing position restricting means capable of freely changing a light passing position; a lens system for focusing the light passed through the light passing position restricting means; an image taking means for taking in the light focused by the lens system; and a distance calculating means for calculating a distance from an imaging element to an object using the taken-in images.

BRIEF DESCRIPTION OF DRAWINGS

FIG. 3A is an explanatory view showing liquid crystal cells in a state of allowing light to pass through and in a state of inhibiting light from passing through.

FIG. 7 is a flowchart showing the procedure of the processing in the distance calculating part.

DESCRIPTION OF THE PREFERRED EMBODIMENTS

Embodiments of the present invention will be described below, referring to the accompanied drawings. An example of an image input apparatus having a distance measurement function will be described below as a first embodiment. In the example, an image input apparatus using a distance measurement function, a distance measurement method and a distance measurement apparatus can be realized. Further, an application of the image input apparatus having the distance measurement function will be described as a second embodiment. It is to be understood that the present invention is not limited to the embodiments to be described below.

Figure 1:
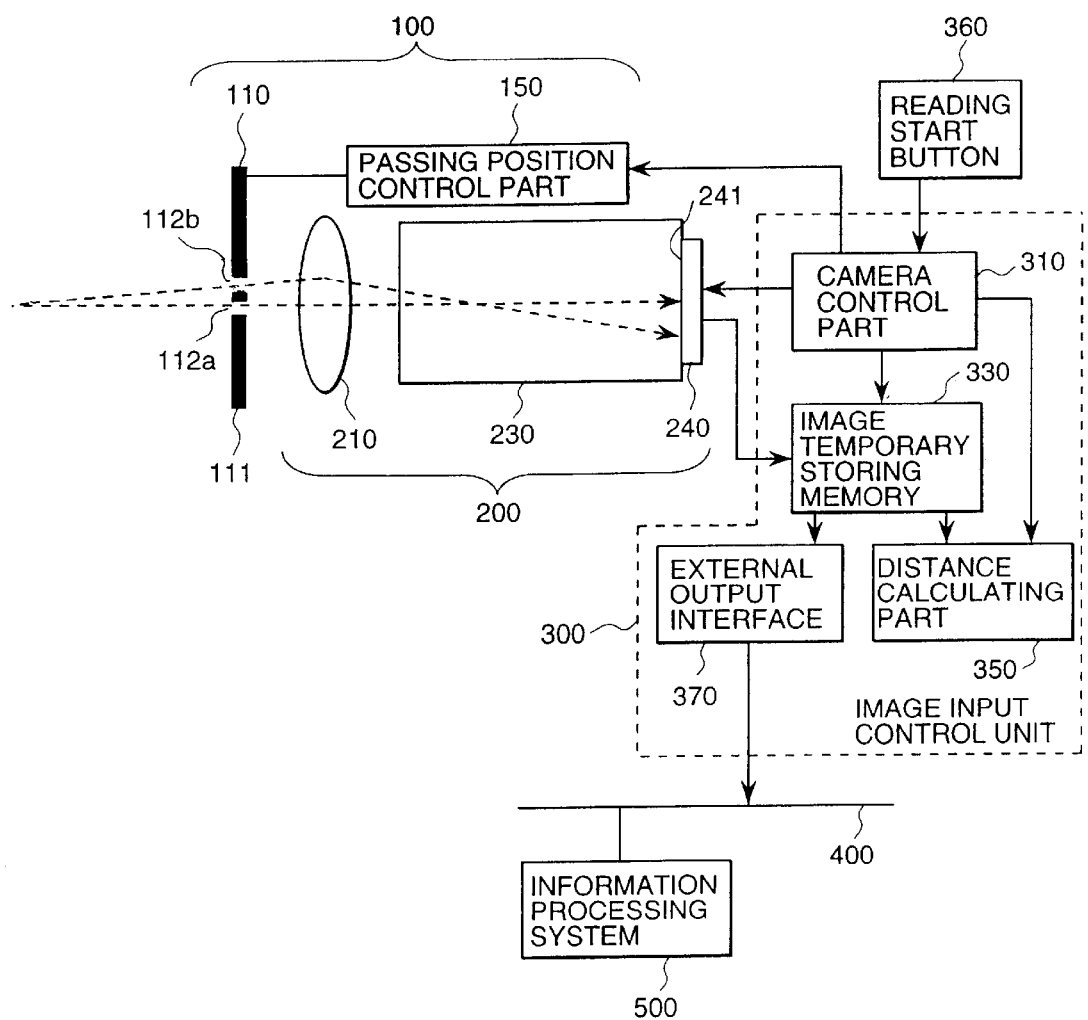
FIG. 1 is a block diagram showing a first embodiment of an image input apparatus having a distance measurement function in accordance with the present invention.

FIG. 1 is a block diagram showing the first embodiment of an image input apparatus having a distance measurement function in accordance with the present invention. The image input apparatus shown in FIG. 1 comprises a light passing position restricting unit 100; a camera 200 having an imaging function; and an image input control unit 300 having a function of performing distance measurement processing based on an image imaged by the camera 200. The image input control unit 300 can be connected to an external unit such as an information processing system 500 through an information transmission medium 400. As the external unit, there is, for example, a display unit, a print unit, a memory unit, a communication unit or the like in addition to the information processing system 500.

The camera 200 comprises a lens system 210 for imaging an image of an object; a camera main body 320; and a CCD 240 of an imaging element serving as a means for taking in the image of the object, the CCD 240 being arranged in the camera main body 230. Further, a single focusing camera not having any focus control mechanism is used as the camera 200.

The light passing position restricting unit 100 is arranged in front of the camera 200, and is a unit for restricting a position allowing light to pass through. It is assumed that the light passing positions are at least one set of different positions. In the concrete, the light passing position restricting unit 100 comprises a mask 110 capable of making a light beam pass though a specified position; and a passing position control part 150 for selectively changing the passing position. The mask 110 has opening parts 112a and 112b at specified positions, and a masking part 111 for blocking the light in the part other than the opening parts 112a and 112b. Although FIG. 1 shows that both of the opening parts 112a and 112b are in open states, the opening parts 112a and 112b may be opened at different timings. The passing position control part 150 performs control for selecting which opening part is opened to allow light to pass through.

Therein, the reason why the construction that the light is allowed to pass through the opening parts 112a and 112b at different timings is employed is to make it easy to determine through which opening part, 112a or 112b, the image projected on the imaging plane 241 of the CCD 240. Therefore, if it is possible to determine through which opening part, 112a or 112b, the image projected on the imaging plane 241 of the CCD 240, a displacement may be detected using the images projected through the opening parts 112a and 112b at a time. Accordingly, a mask 110 having a set of both of the opening parts 112a and 112b may be used. In this case, the passing position control part 150 may be eliminated.

FIG. 1 shows the mask 110 having two opening parts 112a and 112b as a set of the different passing positions. However, the present invention is not limited to the mask of this type. For example, a mask having three or more opening parts may be employed.

The mask 110 may be formed using, for example, a liquid crystal panel or a plurality of shatters. Further, in a case where the lens system 210 is composed of lenses, the mask 110 may be placed inside the lens system 210.

Figure 2A:
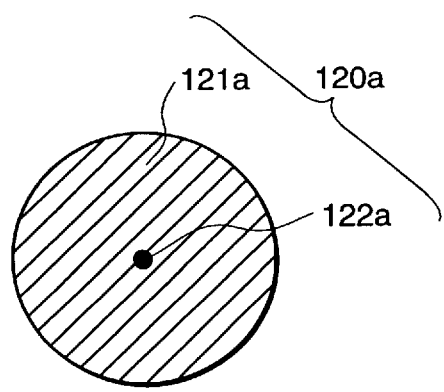
FIG. 2A is a front view showing an example of a mask used as a light passing restriction member.
Figure 2B:
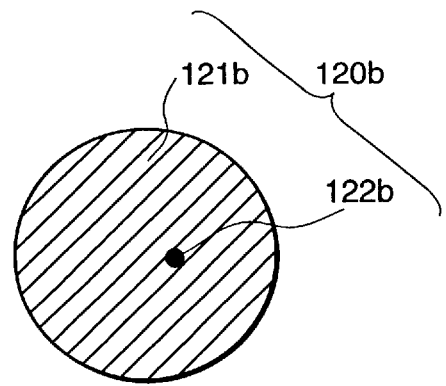
FIG. 2B is a front view showing another example of a mask having an opening at a different position.
Figure 2C:
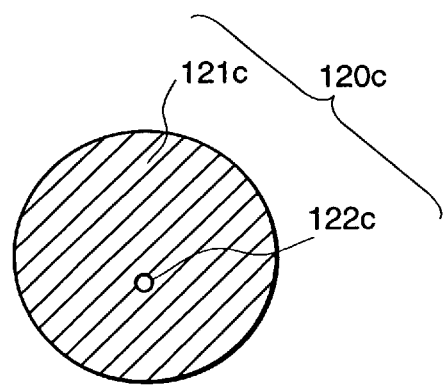
FIG. 2C is a front view showing a still other example of a mask having an opening at a further different position.

Another example of the mask functioning as a member for restricting the light passing position in the light passing position restricting unit is shown in FIG. 2A, FIG. 2B and FIG. 2C. Here, the three masks 120a, 120b and 120c are used as one set. The mask 120a shown in FIG. 2A is an example of a mask for the reference image ($Img^0$). The mask 120a is composed of a masking part 121a and an opening part 122a positioned near the center. At measuring, the opening part 122a is arranged so that the central axis of the opening part may become coaxial with the optical axis. The mask 120b shown in FIG. 2B is an example of a mask for the reference image ($Img^1$). The mask 120b is composed of a masking part 121b and an opening part 122b positioned slightly right-hand side of the masking part 121b (under the state shown by FIG. 2B). At measuring, the opening part 122b is arranged so that the central axis of the opening part may become parallel to the optical axis. The mask 120c shown in FIG. 2C is an example of a mask for the reference image ($Img^2$). The mask 120c is composed of a masking part 121c and an opening part 122c positioned slightly down side of the masking part 121c (under the state shown by FIG. 2C). At measuring, the opening part 122c is arranged so that the central axis of the opening part may become parallel to the optical axis.

Figure 4A:
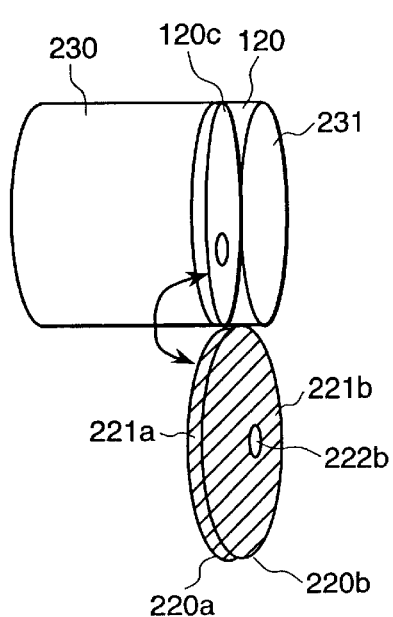
FIG. 4A is an explanatory view showing a state in which a plurality of masks are selectively mounted.
Figure 4B:
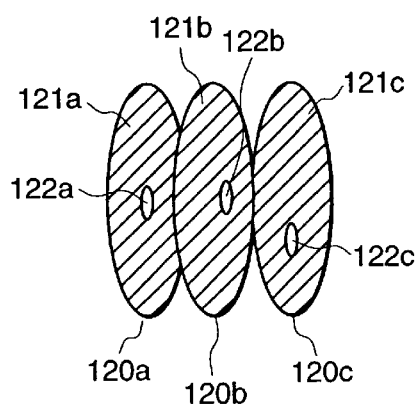
FIG. 4B is an explanatory view showing that position of the opening in each of the masks for changing the light passing position is different mask by mask.

FIG. 4B shows a state in which the three masks 120a, 120b and 120c are arranged along the optical axis. As shown in FIG. 4B, the opening parts 122a, 122b and 122c of the three masks 120a, 120b and 120c are placed at positions different from one another. That is, when only any one of the masks is placed, light can pass through.

By using the mask 120a to determine the common light passing position and by combining the mask 120b or the mask 120c with the mask 120a, the three masks 120a, 120b and 120c compose two sets of different light passing positions. By further adding masks having an opening part at a different position, number of combinations may be increased.

Further, in regard to the positional pattern of the opening parts of the masks 120a, 120b and 120c, the position, the shape of the opening, the size and so on are determined corresponding to an object to be measured and brightness in the surrounding. The measuring accuracy is sometimes changed by varying the position, the shape of the opening, the size and so on.

The image input control unit 300 comprises a camera control part 310 for controlling image taking, timing of changing the opening shape and distance calculation processing; an image temporary storing memory 330 for temporarily storing an image imaged by the CCD 240; a distance calculating part 350 for performing processing of obtaining a distance using the image stored in the image temporary storing memory 330; an external output interface 370 for outputting information on the obtained image and the obtained distance to the external; and a reading start button 360 functioning as an input unit for receiving a reading start instruction from a user, the reading start button 360 being connected to the camera control part 310.

Hardware systems composing the camera control part 310 and the distance calculating part 350 may be constructed by a common computer. For example, the common computer is composed of a central processing unit (CPU), a read-only memory (ROM), a random access memory (RAM) and so on. Each function of the camera control part 310 and the distance calculating part 350 is performed by executing the corresponding software. Of course, each of the camera control part 310 and the distance calculating part 350 may be constructed by a separate hardware. For example, the camera control part 310 and the distance calculating part 350 may be constructed of logical circuits such as programmable logic arrays, respectively.

The camera control part 310 performs control of imaging operation of the camera 200, and makes an instruction of selecting the mask to the passing position control part 150 when an instruction of reading start from the reading start button 360, and makes an instruction of taking in the image to the CCD 240. In addition to these, the camera control part 310 makes instruction of storing the image taken by the CCD 240 to the image temporary storing memory 330. In the case where light is made to pass through the opening parts 112a and 112b at different timings, the instruction of image taking and the instruction of image storing are made at the individual timings. Further, in the case where image is taken through a plurality of sets of passing positions, as to be described later, the instruction of image taking and the instruction of image storing are made for the individual sets of opening parts. However, in a case where there is a passing position common to the individual sets, the processing of taking the image for the common passing position may be made once by using the processing of taking the image commonly to the individual sets. Further, the camera control part 310 makes an instruction of starting a distance calculation to the distance calculating part 350 after completion of the storing operation of the image to the image temporary storing memory 330.

The distance calculating part 350 executes distance calculation using the image stored in the image temporary storing memory 330. In the distance calculation, a displacement of the image on the imaging plane produced by the different passing position is obtained using the stored image. This displacement can be obtained by counting number of pixels of the displacement of the image in taking any one of the passing positions as the reference. Therefore, the displacement may be expressed by number of pixels. The displacement may be expressed by a length dimension using a line density of the pixel.

Therein, for example, the passing position placed on the optical axis may be used as the reference passing position. Next, a distance corresponding to the displacement is obtained from the obtained displacement of the image using calibration information. Here, the calibration information can be pre-stored in the memory in the distance calculating part 350, as described below. For example, the displacement and the corresponding distance may be stored in a form of table. By storing a calculation equation, a distance may be obtained by substituting the displacement into the calculation equation. In this case, the calculation equation can be written in a program for executing the processing of calculating distance as the procedure and the numerical values. The calibration information can be obtained by making light from an object placed at a known distant position pass through the different passing positions and individually projecting the light on the imaging plane of the imaging element, and by changing the distance of the object from the imaging element to obtain the displacement on the imaging plane of the image projected through the different passing position for each of the distances, and by obtaining one-to-one correspondence relation between the actual measure value of the distance from the imaging element to the object and the corresponding obtained displacement.

Figure 9:
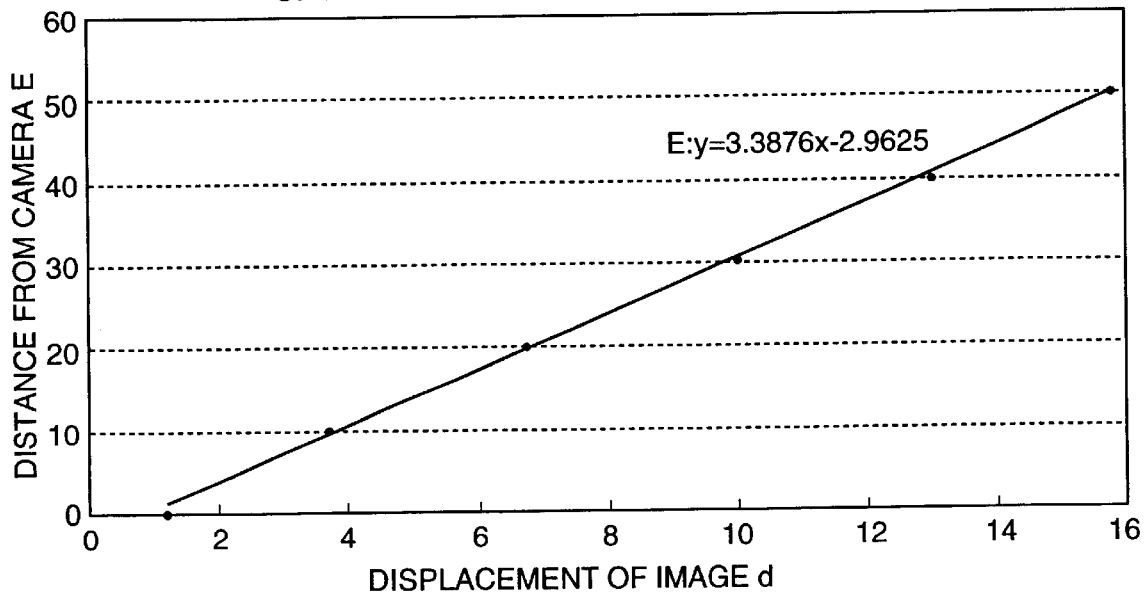
FIG. 9 is a graph showing the measured result of the displacement of image and the value of distance.

FIG. 9 is an example of measured result for the calibration. FIG. 9 shows the example of the one-to-one correspondence relation for the calibration obtained by performing measurement using, for example, the apparatus shown in FIG. 1. In the concrete, the distance values are obtained by measuring the distances at plural positions from the camera 200. On the other hand, at each of the positions, the displacements of images imaged on the imaging plane 241 of the CCD 240 by the light beams passing through the different passing position using the masks shown in FIG. 1, FIG. 2A, FIG. 2B and FIG. 2C. After that, the displacement is obtained, for example, as number of pixels. The above operation is performed at each position from the camera. This measuring method is the same as the procedure of distance measurement to be described later except the actual measuring of the distance.

Figure 10A:
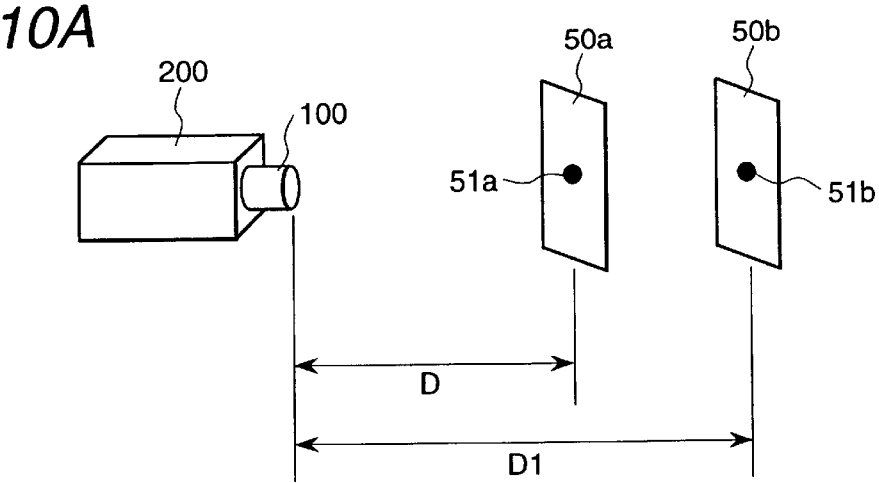
FIG. 10A is an explanatory view showing that when a distance calculation equation is calculated, distance measurement is performed using masks different in the opening position from each other by changing the position of the masks.
Figure 10B:
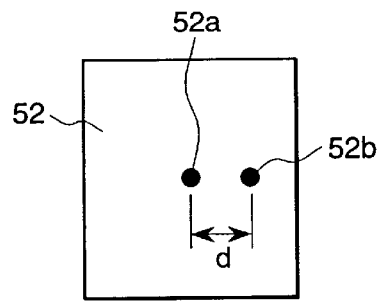
FIG. 10B is an explanatory view showing the displacement of images formed on an imaging plane by the masks different in the opening position from each other.

In regard to the method of obtaining the conversion equation, an example will be described below. As shown in FIG. 10A, the camera 200 is fixed, and an original 50 as an object is set at a position of a distance D from the position of the lens system of the camera 200. At that time, the lens is focused on the surface of the original. In order to make the measurement simple, it is preferable to use the original 50 having a small black round mark 51 in the center of the original, as shown in FIG. 10A. Keeping this state, the original 50 is set at a position of a distance D1 from the lens system of the camera, and the images are read in using the masks having opening position patterns of $P_0$ and $P_i$. The obtained images are defined as $Img_0$ and $Img_i$, respectively. When the two images are overlapped, the black round mark images 52a and 52b can be observed at imaged positions d pixels apart, respectively. The pixel amount d can be obtained by the method that coordinates of the centers of gravity of the two black round marks 52a and 52b observed in the images are calculated. Using the pixel amount d and the distances from the original D and D1, a distance conversion equation $E_i$ when measurement is performed using the mask having the opening position pattern $P_i$ can be obtained as follows.

$$E_i = \frac{D1 - D}{d} \times + D \quad (x: \text{number of pixels}) \tag{1}$$

The measurements of this kind are performed for all the defined patterns $P_i$ (i=1, ..., n) to obtain the conversion equations for the individual patterns.

By performing the above operation for all the mask patterns $P_i$ (i=1, ..., n−1), distance values $d_i$ (i=1, ..., n−1) are obtained. By evaluating the distance values $d_i$ (i=1, ..., n−1), a pixel distance value $dist_{xy}$ is obtained. In regard to the evaluation method, there is, for example, the method that an average value of distance values $d_i$ (i=1, ..., n−1) is calculated.

In order to further improve the accuracy, using measured values of displacement obtained by varying the distance for each pattern of the passing position and the actually measured distance values, an empirical equation is obtained, for example, through the least-squares method. As the result, for example, the following linear equation can be obtained.

$$y = 3.3876x - 2.9625 \quad (2)$$

FIG. 9 is a graph showing an example of a calibration line which expresses the equation (2).

As described above, in the present embodiment, the one-to-one correspondence relation between the distance value and the displacement can be expressed by the linear equation. Therefore, the distance E from the camera 200 can be obtained by substituting the measured displacement into the conversion equation to calculate y. That is, the above equation (2) functions as the conversion equation for converting the displacement to the distance value. In the present embodiment, the procedure of the calculation of y using the equation is written by a program. The central processing unit of the distance calculating part 350 executes the program to calculate the distance. As another method, it is possible that the distance values corresponding to a plurality of different displacements are pre-calculated using the above-mentioned empirical equation to store the result as a table. This table is stored in the memory contained in the distance calculating part 350. When an obtained displacement is a value falling between two displacements given by the table, the distance may be calculated by executing interpolating calculation.

In the case of the plural sets of different passing positions, empirical equations are obtained for the individual sets through the procedure similar to the above. Then, one empirical equation suitable for the purpose is selected from the plurality of the obtained empirical equations to use as the conversion equation of the distance calculation. Further, in the case of the plural sets of different passing positions, one empirical equation may be determined by the minimum-least squared method using the experimental result obtained by the procedure similar to the above-described procedure.

After completion of the preparation described above, distance measurement of an object is performed through the procedure described below. The distance measurement apparatus requires that the distance calculating procedure based on the above-described conversion equation or the displacement-distance one-to-one correspondence relation table based on the conversion equation should be prepared.

The result of the distance calculated as described above is output to an external unit such as the information processing system 500 or the like through the external output interface 370 and the information transmission medium 400. At that time, an image stored in the image temporary storing memory 330 may be also output. By outputting the distance information together with the image as described above, the image can be corrected based on the distance information. Further, there is an advantage that three-dimensional image information can be easily synthesized by combining the distance information and the image information. The external output interface 370 can be constructed using a common interface means such as an SCSI, a USB or an IEEE1394, or a wireless communication means such as a Bluetooth.

Distance measurement using the distance measurement apparatus according to the present embodiment will be described below. The distance measurement using the distance measurement apparatus according to the present embodiment is performed by using the plurality of masks each having a different pattern of the opening position which are capable of materializing plural different light passing positions; conducting an image of an object to the camera 200 through each of the opening portions to image on the imaging plane 241 of the CCD 240; and taking in the imaged image as image information. At that time, one image of the object corresponding to each of the different opening positions is taken in. Accordingly, the plural images are taken in. Further, the taken-in images are stored in the image temporary storing memory 330. Then, a distance of the object is calculated by the distance calculating part 350 using the stored images. At that time, one of the taken-in images is defined as a reference image. Then, a displacement is obtained by comparing the reference image with the other remaining images, and a distance value corresponding to the obtained displacement is calculated.

Here, the masks shown in FIG. 2A, FIG. 2B and FIG. 2C are used. That is, description will be made on the case where the mask 120a having the pin-hole shaped opening part 122a the a position corresponding to the optical center of the lens system is used for the reference image, and the mask 120b having the same sized and shaped opening part at the position in the right-hand side of the center and the mask 120c having the same sized and shaped opening part at the position in the down side of the center are used for the images different from the reference image. The images taken in through the masks 120a, 120b and 120c are defined as $Img^0$, $Img^1$ and $Img^2$, in this order.

A mask attaching part 231 is arranged in the front end of the lens column of the camera main body 230, and a necessary mask among the three masks of 120a, 120b and 120c is selectively mounted in the mask attaching part 321, as shown in FIG. 4A. The selective mounting of the mask can be performed by a mask attaching-and-detaching unit, not shown. The selective mounting by the mask attaching-and-detaching unit is performed based on a control signal from the passing position control part 150. In the concrete, when a control signal expressing a passing position is output, the mask attaching-and-detaching unit detaches a mounted mask when the mounted mask is not the mask corresponding to the passing position expressed by the control signal. Then, the mask attaching-and-detaching unit selects a mask which should be mounted, and mounts the mask onto the mask attaching part 231. Further, the mounting of the mask may be manually performed. In this case, a display unit is connected to the passing position control part 150, and the display unit is made to show a display expressing a mask to be mounted next by the passing position control part 150. For example, the mask to be mounted next is instructed by displaying a mask number on the display unit and by displaying a message expressing changing of the mask and mounting of a new mask on the display unit.

Figure 5:
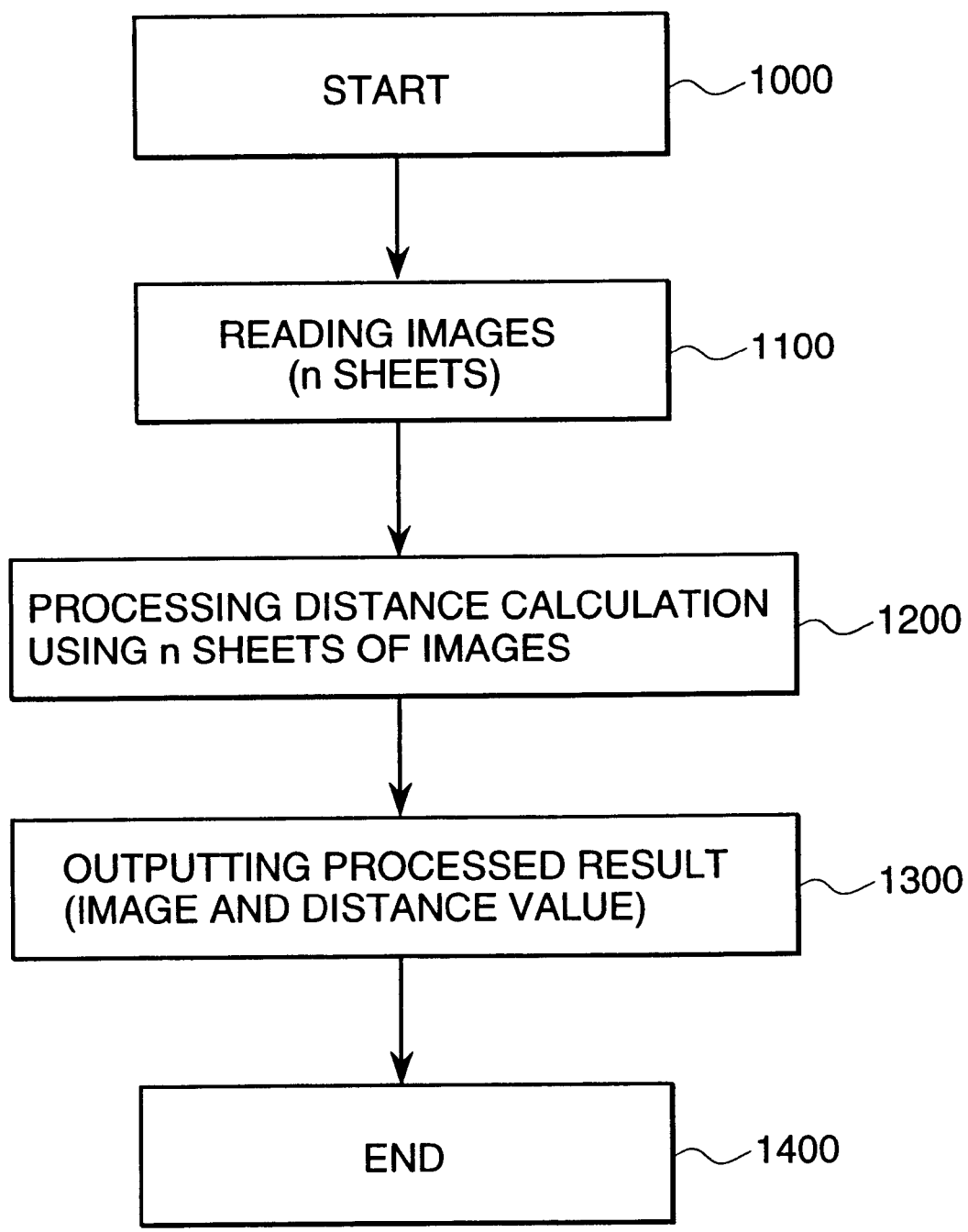
FIG. 5 is a flowchart showing the procedure of the total processing of the distance measurement in the distance measurement apparatus.

FIG. 5 shows the total flow from the image taking-in processing to the distance measuring processing performed by the apparatus in accordance with the present invention. Therein, it is assumed that the information expressing the relation between the displacement of the image on the imaging plane 241 and the distance of the object is already obtained and given in advance. Further, the procedure in an experiment for obtaining the conversion equation expressing the relation between the distance and the displacement can be also performed.

When a user pushes down the reading start button 360, the camera control part 310 receives an operation to the reading start button 360, and selects a mask to be used for taking in an image of the object from the n pieces of prepared masks individually having different opening patterns $P_i$ (i=0, . . . , n) to instruct the passing position control part 150 (Step 1100). This processing is performed for the n pieces of the masks. Then, the taking-in processing of taking in the images projected on the imaging plane of the CCD 240 through each of the opening part is executed. After that, the distance calculating part 350 executes the distance calculating processing using the n sheets of images stored in the image temporary storing memory 330 (Step 1200). The obtained distance information and the images stored in the image temporary storing memory 330 are output through the external output interface 370 and the information transmission medium 400 (Step 1300). Thus, a series of distance calculating processing is completed (Step 1400).

In regard to an output format of distance values, there is a well known type of distance image in which a distance value between the camera and the object is input to a pixel value of the taken-in image. This embodiment can output in this type.

Each of the processes will be described in detail below. Here, it is assumed that number of the opening position patterns (opening shape patterns) of the masks used at taking in the images is defined as n pieces ($P_i$ (i=0, ..., n), here i=0 is a pattern for the reference image). Further, it is defined that the pixel size of the image input by the CCD 240 is HEIGHT pixels in vertical and WIDTH pixels in horizontal, and the coordinate system in the image is (x, y)=(0, 0) at upper left and (x, y)=(WIDTH, HEIGHT) at down right.

Figure 6:
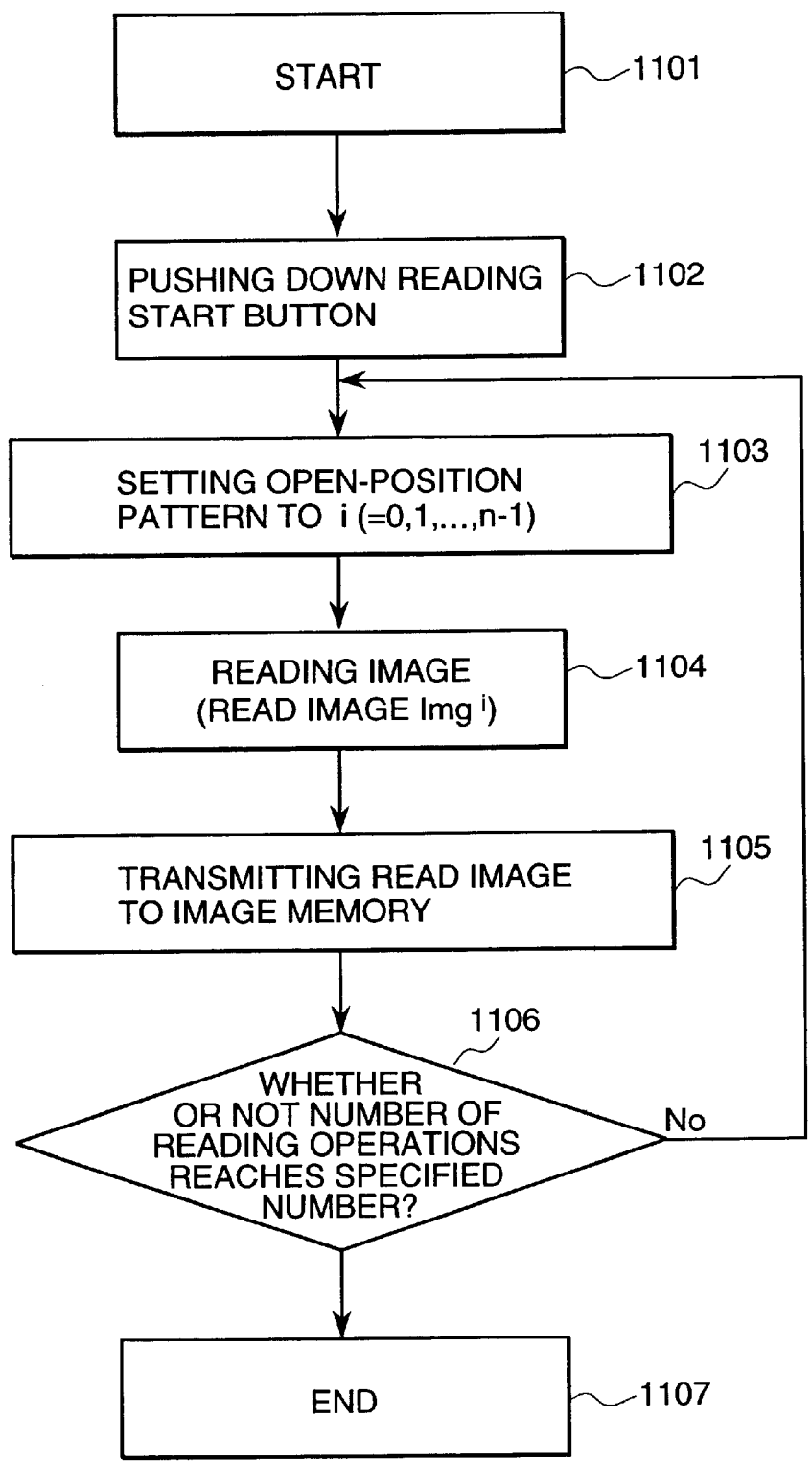
FIG. 6 is a flowchart showing the procedure of the image reading processing in the image input apparatus.

FIG. 6 is a flowchart showing the image reading-in processing. This processing is mainly executed by the camera control part 310.

As the apparatus is started (Step 1101), the camera control part 310 is waiting for pushing-down of the reading start button 360 by the user. As the user pushes down the reading start button 360, the camera control part 310 receives the operation (Step 1102). The camera control part 310 instructs the passing position control part 150 to set a specified mask into the front portion of the lens system 210. That is, the camera control part 310 instructs the passing position control part 150 to initially set the mask having the opening position pattern $P_0$ for the reference image among the pre-defined opening position patterns into the front portion of the lens system 210 (Step 1103). After completion of setting, the camera control part 310 instructs the CCD 240 to execute operation of reading the image to make the CCD read the image (Step 1104). The read image is transmitted from the CCD 240 to the image temporary storing memory 330 to temporarily store the image in the image temporary storing memory 330 (Step 1105). Therein, the image data is attached with, for example, an index $Img^0$ (Step 1105). This is for making access to the image data easy.

After that, setting of the mask is similarly performed (Step 1103), reading of the image is performed (Step 1104), and transmitted to the memory 330 is performed (Step 1105) for all the remaining n pieces of the prepared masks. Then, it is checked that the operation of image reading for each of the masks having the opening pattern corresponding to each of the different opening positions is completed (Step 1106), and the reading processing is completed when it is checked (Step 1107).

At the time when the reading processing ends, all the images are stored in the image temporary storing memory 330 and the taken-in images through the individual masks are attached with the indexes $Img^i$ (i=0, 1, ..., n−1). After that, the distance calculating processing is executed using $Img^i$ (i=0, 1, ..., n−1).

FIG. 7 shows the flow of the distance calculating processing. This processing is executed mainly by the distance calculating part 350. The distance calculating part 310 starts the processing corresponding to a starting instruction of the camera control part 310 (Step 1201).

Figure 8A:
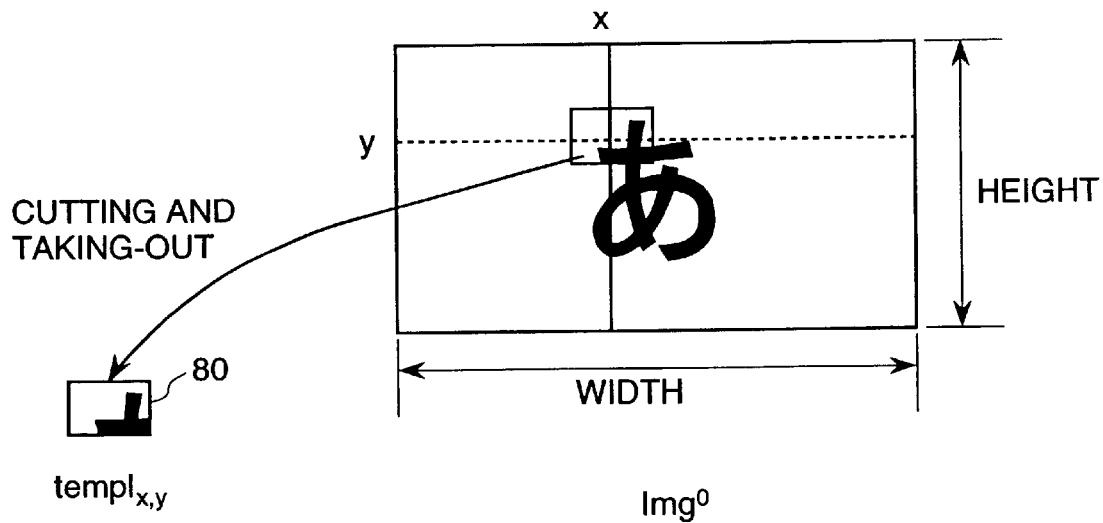
FIG. 8A is an explanatory view showing the image cutting and taking-out processing.

The distance calculating part 350 starts the distance calculation processing initially from the pixel of coordinate (x, y)=(0, 0) (Step 1202). Initially, cutting and taking-out of an image in the peripheral portion of the coordinate (x, y) of the reference image is executed (Step 1203). This processing is processing to cut and take out an image in the peripheral portion of a target pixel (x, y) as a template image 80, as shown in FIG. 8A. The pixel size of the cut and taken-out image varies depending on the pixel size of the input image. Therefore, an experiment is conducted in advance to determine the pixel size which is small in matching miss at pattern matching to be performed later and as small as possible.

Figure 8B:
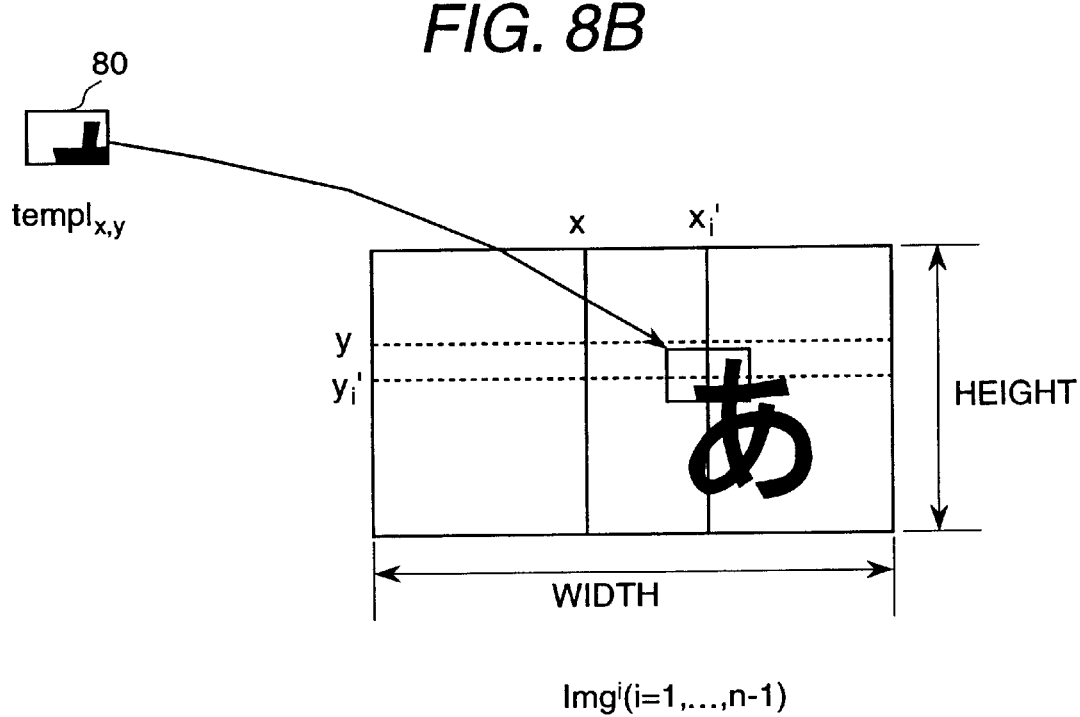
FIG. 8B is an explanatory view showing the pattern matching processing executed by using the cut-and-taken-out image.

Next, pattern matching processing is performed using the template image 80 and the image $Img^i$ (i=1, 2, ..., n−1) (Step 1205). This processing is processing to perform image search using pattern matching which part of the read-in image $Img^i$ (i=1, 2, ..., n−1) other than the reference image the template image 80 exists, as shown in FIG. 8B. The pattern matching method generally reported in the textbooks on image processing can be employed as this pattern matching processing, and accordingly it is easy to realize the pattern matching processing. By this processing, it is possible to know which part of the read-in image $Img^i$ (i=1, 2, ..., n−1) the template image 80 exists. A coordinate (x', y') where the two images match can be obtained (Step 1206).

Number of pixels between the two coordinates of (x, y) and (x', y') is obtained as a displacement of the target pixel (x, y). There, since the phenomenon is observed as if the image moved on the pixel plane of the imaging element, the displacement may be called as a pixel moving amount. This amount is defined as d.

As the method of obtaining number of pixels between coordinates, the Euclid distance between two coordinates, shown below, is used.

$$d = \sqrt{(x-x')^2 + (y-y')^2} \quad (3)$$

A distance value $d_i$ in the pixel (x, y) is calculated from the obtained displacement d using the pre-given conversion equation of the displacement and the distance value (Step 1208).

By performing the above operation for all pixels in the image, a distance value for each pixel is obtained. Further, since volume of the calculation becomes large in a case where the calculation is performed on the pixels of the total image, it is possible to shorten the processing time by calculating only the coordinates of parts necessary for distance values and by performing approximate processing on the remaining pixels.

As another embodiment of the present invention, an application example of a non-contact scanner to which the image input apparatus having the distance measurement function in accordance with the present invention is applied will be described below.

The non-contact scanner is advantageous because of less limitation at setting originals compared to the conventional products such as a flat head scanner and a sheet scanner. That is, the conventional scanner requires operations of turning over the original, making the original pass through the sheet feeder etc. However, the non-contact scanner does not require these operations. It is sufficient to simply put the original onto the original table, and accordingly the non-contact scanner has a large advantage in easiness of handling which the conventional products do not have.

However, in the case where an image is taken in by the user's operation of simply putting the original on the original table, there is a disadvantage in that the images of letters, a picture and a photograph in the original read by the camera are largely deformed when the original has unevenness such as a wrinkle, a fold, a bend or the like.

The image input apparatus having the distance measurement function in accordance with the present invention can acquires both of images and distance information. Therefore, when the image input apparatus having the distance measurement function in accordance with the present invention is used as a camera for image inputting, the deformation of the image can be corrected. That is, the non-contact scanner in accordance with the present invention can materialize an apparatus capable of making less deformed images similar to the conventional flat head scanner, the conventional sheet scanner and the like with keeping the easiness of use which is an advantage of the non-contact scanner.

Figure 11A:
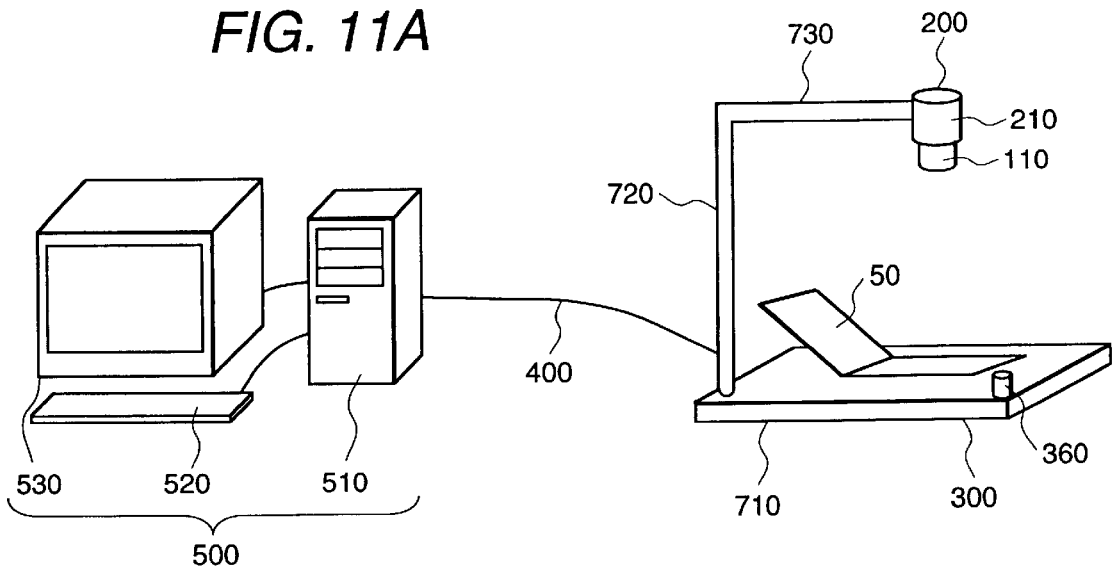
FIG. 11A is a perspective view showing the outline of construction of a non-contact scanner.

FIG. 11A is a perspective view showing the non-contact scanner having the image deformation correcting function to which the image input apparatus having the distance measurement function in accordance with the present invention is applied.

The scanner 700 shown in FIG. 11A comprises an original table 710; a support column 720 provided to the original table 710; an arm 730 projecting from the support column 720 toward the upper portion of the original table 710; a camera 200 supported by the arm 730; and an image input control unit 300 contained in the original table 710. A reading start button 360 is arranged in an externally exposed state on a portion of the original table 710.

The camera 200 is supported by the arm 730 and arranged at a position capable of seeing almost the whole upper surface of the original table from the upper portion of the original table 710. A lens system 210 and a mask 110 of the light passing position restricting unit 100 are mounted onto the object side of the camera 200. It should be understood that the present invention is not limited to the mask 110.

The image input control unit 300 contained in the original table 710 is connected to a computer 510 of an information system 500 through an information transmitting medium 400, for example, a cable to send the acquired image information together with the distance information to the computer 510. An input unit 520 for receiving inputs such as instruction and a display unit 530 for displaying images are connected to the computer 510.

Figure 12:
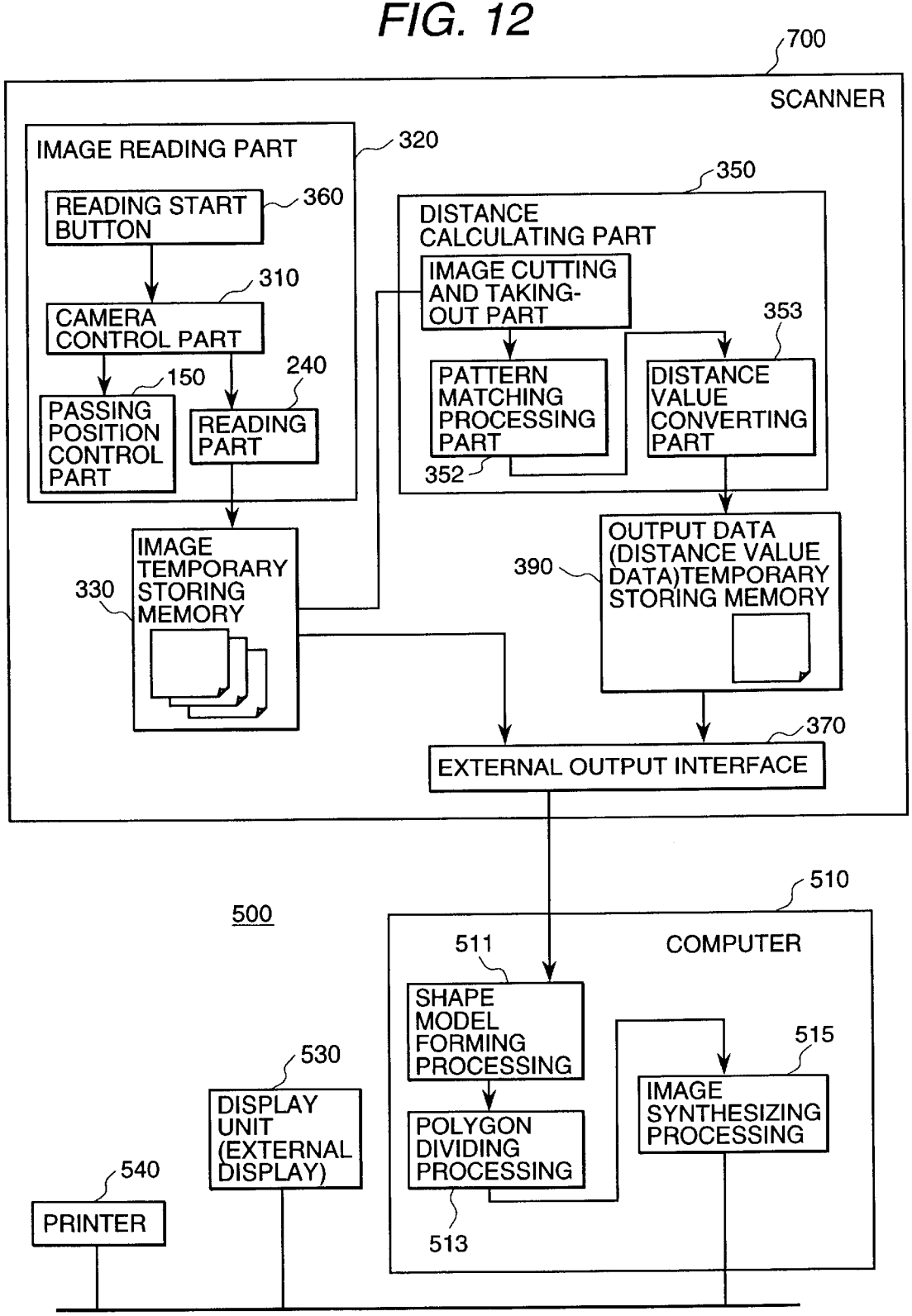
FIG. 12 is a block diagram showing the functional structure of the non-contact scanner having an image deformation correction function.

FIG. 12 is a block diagram showing the functional structure of the non-contact scanner having an image deformation correction function. The scanner 700 shown in FIG. 12 is roughly composed of an optical system part of the camera, not shown; an image reading-in part 320; a distance calculating part 350; an image temporary storing memory 330; an output data temporary storing memory 390; and an external output interface 370.

The function of the image reading-in part 320 can be realized by a reading-in part 240 composed of the reading start button 360; the camera control part 310; the passing position control part 150; and the CCD and so on. The image read in by the image reading-in part 320 is transmitted to the image temporary storing memory 330 to be stored in the memory 330. The distance calculating part 350 has an image cutting-and-taking-out part 351; a pattern matching processing part 352; and a distance converting part 353 as the function. The distance information calculated by the distance calculating part 350 is transmitted to the output temporary storing memory 390 to be temporarily stored in the memory 390. After completion of the distance calculation, the image and the distance information are transmitted to an external unit such as the computer 510 of the information processing system 500 through the external output interface 370 when an instruction of data reading out is received from the external through the external output interface 370.

Each of the functions in the scanner described above has each of the functions similar to the image input apparatus having the distance measurement function in accordance with the present invention. In addition, the contents of the processing are also similar to those of the image input apparatus having the distance measurement function. Further, it is possible that the processing of the distance calculating part 350 is executed by an external unit (a computer) using software, and the scanner main body is composed of only the image reading part and the output interface. In this case, an equivalent scanner can be materialized by adding the opening position control part and the opening shape variable masks to a reading part of a conventional product of scanner. Therefore, there is an advantage in that the commercial product of scanner can be effectively used.

The images and the distance information output from the scanner 700 are transmitted to the computer 510. The received images and the received distance information are processed by the computer 510 using software to output the images of which the deformation in the image is corrected. As the functions realized by processing using software by the computer 510, there are shape model forming processing 511 for modeling the shapes of fold and bend in the original based on the distance information; polygon dividing processing 513 for executing polygon dividing of the read-in image according to the shape model in order to correct the deformation; and image synthesizing processing 515 for generating a deformation-corrected image using the technology of texture mapping the image by the divided polygon. The computer 510 can output the deformation-corrected image to the display unit 530 and the printer 540. The image having less deformation is output to the display unit 530 and the printer 540.

Further, in the example shown in FIG. 11A, the wireless means such as Bluetooth may be use for transmitting the image. By doing so, cables are eliminated to increase the degree of freedom for the installation. Accordingly, the usability can be improved. Further, the image input control unit 300 and the reading start button 360 are integrated to the camera 200 to form a unit. By constructing such a unit, the unit can be used by taking off the unit from the support column, and accordingly can be used by attaching the scanner onto an edge of a desk or a wall, which further improves the usability.

Operation of the scanner will be described below. Here, it is assumed that scanning of an original is performed in the state that the original 50 is mounted on the original table 360.

Operation of the scanner is performed by that the image input control unit 300 receives an instruction of reading start by pushing down of the reading start button 360, and takes in an image using the camera 200. As described previously, the image input control unit 300 makes light from the original 50 pass through the different passing positions using the masks 110 to project the light on the image forming plane of the imaging element of the camera 200, respectively; and detects a displacement on the image forming plane between the images; and obtains a distance of the object corresponding to the detected displacement from the information showing the one-to-one correspondent relation between the distance of the object and the displacement. Then, the distance information is output to the computer 510 together with the acquired image of the original using the camera 200. The computer 510 corrects deformation of the image information caused by unevenness of the original using the distance information among signals input from the image input control unit 300.

Figure 11B:
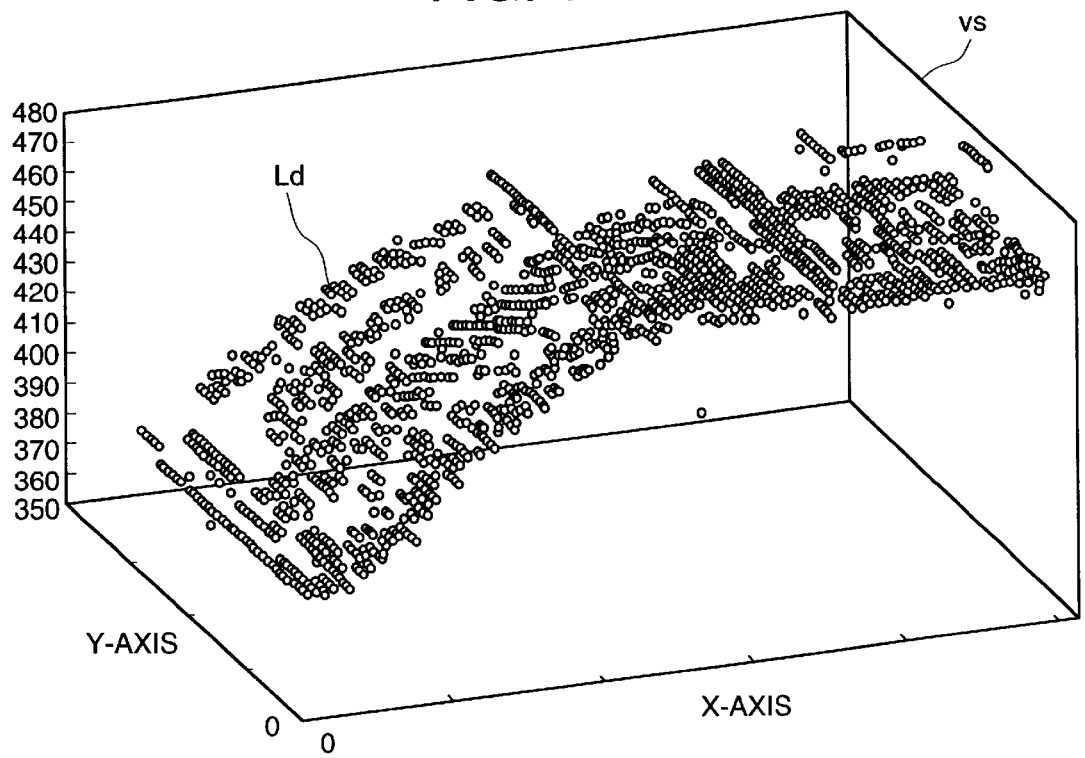
FIG 11B is an explanatory graph showing a three-dimensional distribution of original plane positions measured by the scanner.

FIG. 11B is a view visually expressing a distance distribution state Ld of each point of the original 50 by plotting the measured result of distances in a virtual three-dimensional space of the original table. In FIG. 11A, the original 50 folded in a valley-shaped state and in a partially rising state is put on the original table 310. Therefore, as shown in the virtual space of FIG. 11B, the points in the region corresponding to the part mounting on the original table 360 are flatly distributed on a level of a constant distance from the camera. On the other hand, it can be understood that the points of the original 50 in the region corresponding to the rising part become small in the distance from the camera toward the edge of the original 50 from the valley-shaped folded position. This visual state may be also obtained by processing the distance information using the computer 510. The processed result can be shown in the state of, for example, FIG. 11B by being displayed on the display unit 530.

As described above, in the non-contact scanner to which the present invention is applied, information showing a distance distribution of an object from the camera can be acquired. Therefore, it is possible that the image of the object having the surface in an uneven state can be corrected to an image in a flat state using the distance distribution information. In the case of FIG. 11B, the image of the original can be corrected to the flat state by correcting the bend region from the folded line portion of the object.

Deformation correcting processing processed by the computer 510 will be described below, referring to FIG. 13A to FIG. 14.

Figure 13A:
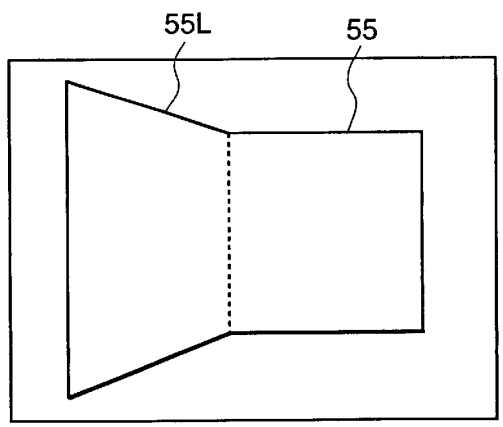
FIG. 13A to FIG. 13D are explanatory views schematically showing the outline of the processing of correcting the image deformation of an object extracted by the scanner.
Figure 13B:
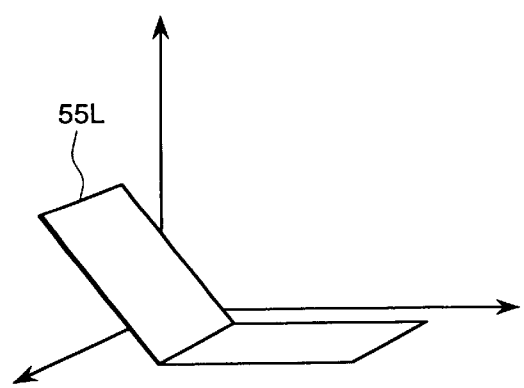
Figure 13C:
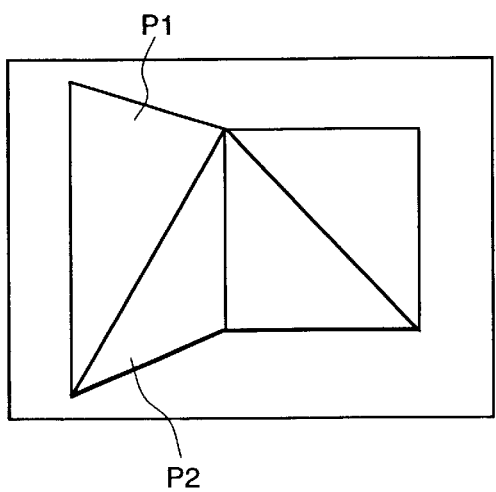
Figure 13D:
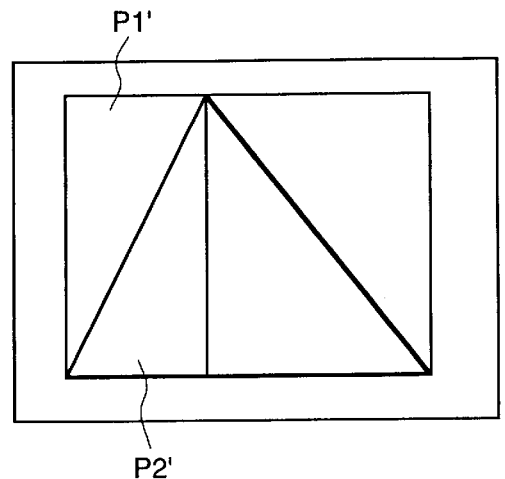

FIG. 13A is a view showing an example of an image obtained by taking a picture of an original which is folded in a valley-shaped state and in a partially rising state. As shown in FIG. 13A, the shape of the left side part 55L of the image of the original 55 is deformed though the shape of this part 55L should be a part of the rectangular shape. Therefore, the distance information between the camera and each point of the original is acquired together with inputting of the image using the scanner in accordance with the present invention. As shown in FIG. 13B, the shape of the original can be plotted in the three-dimensional space. The image of this part of the original rising from the original table is divided into triangular polygons corresponding to the change of distance based on the three-dimensional information. In regard to the polygon dividing method, a software program for executing polygon dividing using three-dimensional point group data is commercially available. Therefore, the polygon dividing can be executed using the software program. As the result, in the case of FIG. 13C, the image of the part of the original can be divided into two triangular polygons P1 and P2. As shown in FIG. 13D, the image without deformation can be obtained by converting the divided polygons P1 and P2 to the normal polygon shapes without deformation using the texture mapping processing of the computer graphics technology and by synthesizing the images using mapping operation of image.

Figure 14:
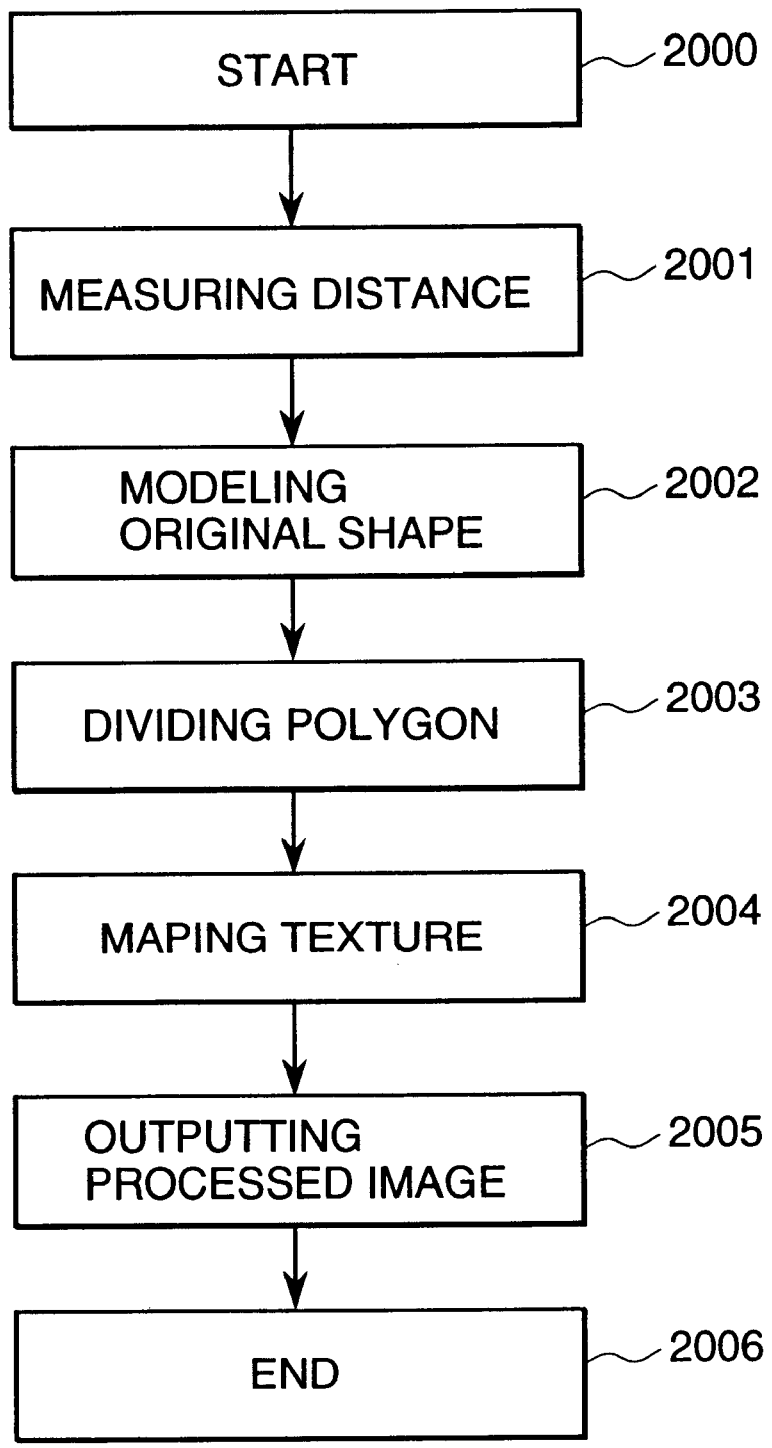
FIG. 14 is a flowchart showing the procedure of the deformation correction processing.

FIG. 14 is a flowchart showing the procedure of the deformation correction processing based on the distance measurement. After starting (Step 2000) of the processing, distance measurement is executed according to the processing in the above-described image input apparatus in accordance with the present invention (Step 2001). The distance information is acquired. Modeling of the shape of the original is executed based on the acquired distance information (Step 2002). The distance measurement between the original 50 and the camera 200 (the center of the lens system or the image element) is performed, and the distance information between each point of the original and the camera (the lens system or the image element) is obtained, and the fold and bend information of the original is modeled. The polygon dividing of the image of the original is executed based on the modeled information (Step 2003). The texture mapping for all the divided polygons is executed (Step 2004). The texture-mapping processed image is output (Step 2005), and thus the processing is completed (Step 2006).

Although the example shown FIG. 13 is relates to an example of the original folded in a valley-shaped state, the non-contact scanner to which the present invention is applied can cope with a case of a gently folded original or an overall uneven original. That is, the non-contact scanner can cope with any original if the image can be acquired.

Another example of a mask used for the passing position restriction will be described below.

Figure 3A:
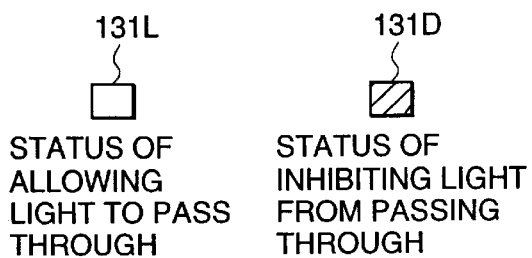
Figure 3B:
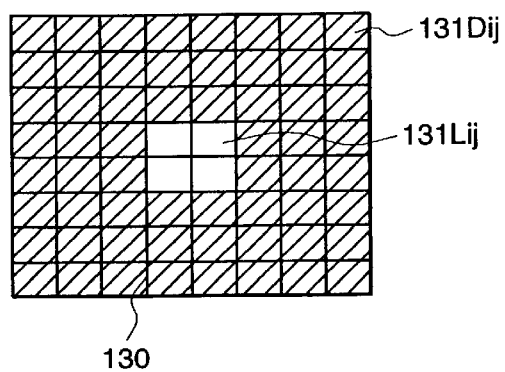
FIG. 3B is an explanatory view showing an example of the mask which is materialized using liquid crystal display elements.
Figure 3C:
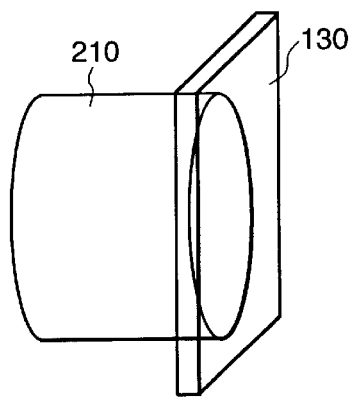
FIG. 3C is a schematic view showing a mask panel attached to a lens system of a camera.

FIG. 3A and FIG. 3B show the example of a passing position restricting member using a liquid crystal panel. As shown in FIG. 3C, the liquid crystal panel 130 is attached at a position, for example, in front of the lens system 210 of the camera. The size and the resolution of the liquid crystal panel can be determined so as to meet with the lens system 210 used. Therein, the size and the resolution sometimes need to be changed depending on the attaching position. The attaching position is not limited to the position shown in FIG. 3C if optically possible. For example, the passing position restricting member can be attached at the conjugate position. As shown in FIG. 3C, the liquid crystal panel 130 is attached to the front face of the lens system so closely that light may not enter through the attaching gap.

The liquid crystal panel 130 is constructed of a plurality of cells $131_{ij}$ arranged in a matrix. The cells $131_{ij}$ are individually applied with voltage to be brought in a status of allowing light to pass through or in a status of inhibiting light from passing through, as shown in FIG. 3A. By making use of this characteristic, the passing position can be set at an arbitrary position by controlling a cell in an arbitrary address among the cells composing the matrix so as to be brought in the light passing status. The control technology generally used in the liquid crystal display can cope with the control for which position is brought in the light passing status.

In the case of using the liquid crystal panel, there is an advantage in that one-to-one correspondence relation between the light passing position and the measured data can be easily and automatically obtained during measurement because an arbitrary position can be electrically brought in the light passing status. Further, There is an advantage in that the area of the opening part and the opening shape can be arbitrarily changed corresponding to an instruction. By selecting the opening position, the opening shape and the opening area, the optimum distance measurement can be performed corresponding to the optical characteristic of the object.

According to the present invention, distance measurement of an object can be stably and accurately performed without any highly accurate focus control mechanism.

What is claimed is:

1. A distance measuring method for measuring a distance from an imaging element to an object by optically taking in an image of the object using said imaging element, comprising:

making light from an object at a known distance from said imaging element pass through light passing positions that are different from each other so as to project the light on an image forming plane of said imaging element, respectively;

obtaining a displacement on the image forming plane between the images projected through said different light passing positions, said displacements being obtained by changing the distance from said imaging element to the object;

pre-storing information showing a one-to-one correspondence between the known value of distance from said imaging element to the object and said displacement;

making light from an object, of which a distance is to be measured, pass through said different light passing positions to project the light on said image forming plane of said imaging element, respectively;

detecting a displacement on the image forming plane between the images projected through said different light passing positions;

obtaining a distance from said imaging element to said distance-measured object corresponding to said detected displacement from said information showing the one-to-one correspondence between the distance from said imaging element to the object and said displacement;

preparing a plurality of sets of said different light passing positions, and pre-storing information showing the one-to-one correspondence between the known value of distance from said imaging element to the object and said displacement for each of said sets;

making light from an object, of which a distance is to be measured, pass through said plurality of sets of different passing positions to project the light on said image forming plane of said imaging element, respectively;

detecting a displacement on the image forming plane between the images projected through each set of said different light passing positions;

obtaining a distance from said imaging element to said distance-measured object corresponding to said detected displacement from said information showing the one-to-one correspondence between the value of distance from said imaging element to the object and said displacement for the corresponding set of the passing positions; and obtaining a distance of said distance-measured object by statistically processing said distances individually for said sets.

2. A distance measuring method according to claim 1, wherein, among said plurality of sets of light passing positions, one of said light passing positions in each set is a position common to all said sets.

3. A distance measuring method according to claim 2, wherein said light passing position common to all said sets is positioned on an optical axis at the time of optically taking in the image of said object.

4. A distance measuring method according to any one of claims 1, 2 and 3, comprising:

performing passing of light through said different light passing positions at different light timings for each of said light passing positions;

storing the position of the image on the image forming plane; and obtaining the displacement on the image forming plane of the light passed through said different light passing positions using said stored position.

5. An image input apparatus having a distance measurement function, which comprises:

opening pattern locating means for locating first and second opening patterns different from each other so as to pass light through the first and second opening patterns in a direction substantially perpendicular to an axis of the light;

a lens system for focusing the light that has passed through the first and second opening patterns;

image taking-in means for taking in an image from the light focused by the lens system; and distance calculating means for calculating a distance from an imaging element to an object using the images produced by the light that has passed through the first and second opening patterns.

6. An image input apparatus having a distance measurement function according to claim 5, wherein said image taking-in means outputs an image taking-in start signal, and said light passing position restricting means executes a restricting operation of a light passing position corresponding to the output of said image taking-in start signal.

7. A distance measurement apparatus according to any one of claims 5 and 6, wherein said light passing position restricting means includes a liquid crystal panel.

8. A distance measurement apparatus according to any one of claims 5 and 6, wherein said light passing position restricting means has a plurality of masks having different opening positions.

9. A distance measurement apparatus according to any one of claims 5 and 6, wherein, in a case where said lens system is composed of a plurality of lenses, said light passing position restricting means is arranged between the lenses of said lens system.

10. A distance measurement apparatus according to any one of claims 5 and 6, wherein said light passing position restricting means uses a plurality of pinholes as the shape of the opening portion.

11. A distance measurement apparatus according to any one of claims 5 and 6, wherein said distance calculating means comprises:

means for making light from an object at a known distance from said imaging element pass through light passing positions different from each other so as to project the light on an image forming plane of said imaging element, respectively, and obtaining a displacement on the image forming plane between the images projected through said different light passing positions, said displacements being obtained by changing the distance from said imaging element to the object, and then storing information showing one-to-one correspondence between the known value of distance from said imaging element to the object and said displacement;

means for making light from an object, of which a distance is to be measured, pass through said different light passing positions so as to project the light on said image forming plane of said imaging element, respectively, and detecting a displacement on the image forming plane between the images projected through said different light passing positions; and means for obtaining a distance from said imaging element to said distance-measured object corresponding to said detected displacement from said information showing the one-to-one correspondence between the distance from said imaging element to the object and said displacement.

12. An image input apparatus having a distance measurement function according to any one of claims 1 to 3, 5 and 6, wherein the measured distance information and the image are output at one time.

13. A non-contact image input apparatus, said non-contact image input apparatus being an image input apparatus for optically reading a visually drawn image, which comprises:

a scanner for taking in the image by scanning an object to be read; and a display or a printer for displaying the read result, wherein the image input apparatus described in claim 12 is used as said scanner.

14. A non-contact image input apparatus according to claim 13, which comprises means for expanding the image to a plane using the measured distance information.

15. A non-contact image input apparatus according to claim 14, which comprises a switch or an interface for instructing whether or not the operation of expanding the image to the plane is to be performed.

16. A distance measuring method of measuring a distance from an imaging element to an object by optically taking in an image thereof by the imaging element, comprising:

passing light from an object through parts of a lens by use of opening patterns to beforehand obtain a correspondence relationship between distance values to the object according to positions of the opening patterns and amounts of displacement of corresponding images on an image forming plane of the image element;

passing light from an object to be distance-measured through an opening pattern to detect amounts of displacement on the image forming plane of an image of the object to be distance-measured which has been projected on the image forming plane of the imaging element and forming an image of the object to be distance-measured projected with the opening pattern located so as to pass the light through the opening pattern by moving the opening pattern in a direction perpendicular to an axis of the light, and obtaining a distance, corresponding to the detected amount-of-displacement, from the imaging element to the object to be distance-measured on the basis of the correspondence relationship.

* * * * *